United States Patent [19]

Mantovani

[11] Patent Number: 4,916,341

[45] Date of Patent: Apr. 10, 1990

[54] ELECTRIC ARBOR INTEGRATED WITH AN INDUCTION MOTOR

[75] Inventor: Elis Mantovani, Cadempino, Switzerland

[73] Assignee: Tecnodelta S.A., Manno, Switzerland

[21] Appl. No.: 233,968

[22] Filed: Jul. 25, 1988

Related U.S. Application Data

[62] Division of Ser. No. 79,029, Jul. 29, 1987, Pat. No. 4,796,353.

[30] Foreign Application Priority Data

Nov. 24, 1986 [CH] Switzerland .................. 4690/86

[51] Int. Cl.⁴ .................. B23B 19/02; H02K 5/16
[52] U.S. Cl. .................. 310/50; 279/46 R; 310/90
[58] Field of Search .................. 310/42, 50, 90; 384/504, 557, 551; 408/239, 239 A; 409/231, 232, 233; 279/41 R, 46 R

[56] References Cited

U.S. PATENT DOCUMENTS

| | | | |
|---|---|---|---|
| 3,972,148 | 8/1976 | Beauchet et al. | 51/5 D |
| 4,534,686 | 8/1985 | Nakamura et al. | 409/231 |
| 4,573,809 | 3/1986 | Jacob | 384/517 |
| 4,677,719 | 7/1987 | Link | 409/233 |
| 4,796,353 | 1/1989 | Mantovani | 310/42 |

FOREIGN PATENT DOCUMENTS 1264078  2/1972  United Kingdom .................. 310/90

*Primary Examiner*—Patrick R. Salce
*Assistant Examiner*—D. L. Rebsch
*Attorney, Agent, or Firm*—Young & Thompson

[57] ABSTRACT

An electric arbor integrated with an induction motor (2), for frequencies up to and beyond 3000 Hz, is made up of a sleeve (3), made of two coaxial tubular parts (3' and 4") finished at the same time, assuring the identical distance (3''') achieving extreme precision of the arbor (1). The arbor shaft (23), supported by bearings (6, 6' and 6") is inserted into the sleeve (3). To the back end of the sleeve (3) is fastened the motor (2), whose stator core stack (4) is made with thin laminations and into said stator (4) is introduced insulating resin charged with substances improving the thermal conductivity. The rotor (5), mounted cantilevered on the arbor shaft (23), is made of thin condutive laminations, fastened by the damping resin, which, melted on the ends, form the short-circuit rings contained by the rings.

2 Claims, 5 Drawing Sheets

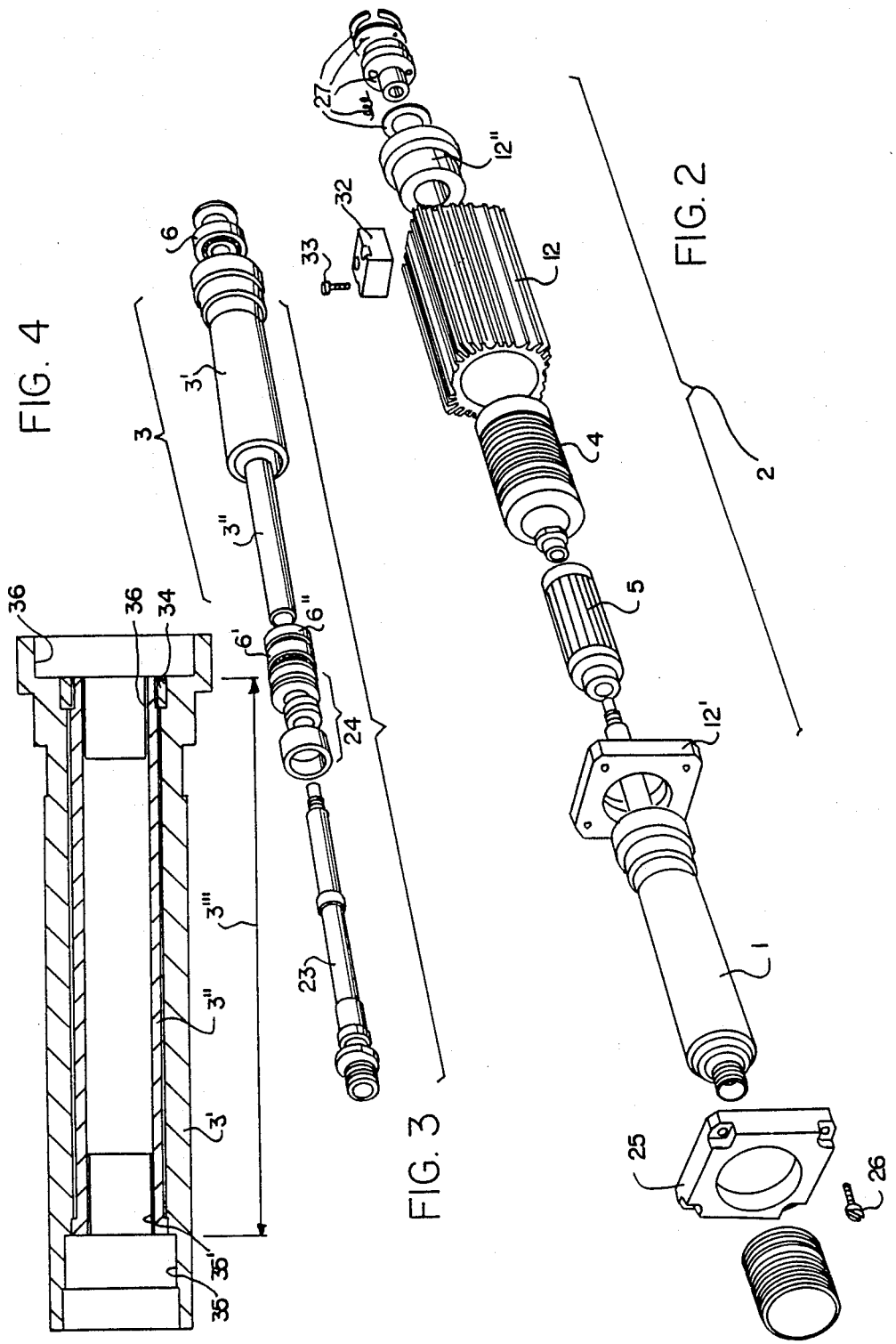

4,916,341

ELECTRIC ARBOR INTEGRATED WITH AN INDUCTION MOTOR

This application is a division, of application Ser. No. 079,029, filed July 29, 1987 now U.S. Pat. No. 4,796 353.

This invention has as its object an electric arbor integrated with an induction motor for frequencies up to and beyond 3000 Hz, suitable for mechanical workings, making possible high performance (precision, speed, power and life) extreme compactness (very limited weight and size), notable modularity (versatility in use) and low cost, characterized in that extreme precision is concentrated in the sleeve of the arbor, while the compactness is governed by the stator and rotor.

By innovative mechanical and electromechanical technologies it is possible, according to the invention, to achieve a family of low-cost arbors, making possible a very wide range of high-precision mechanical work.

The accompanying drawings represent a preferred embodiment of the electric arbor in question.

FIG. 2 represents the unit disassembled into individual elements partially grouped.

FIG. 3 represents the arbor disassembled into individual elements.

FIG. 4 represents the sleeve in axial section.

Figure 1:
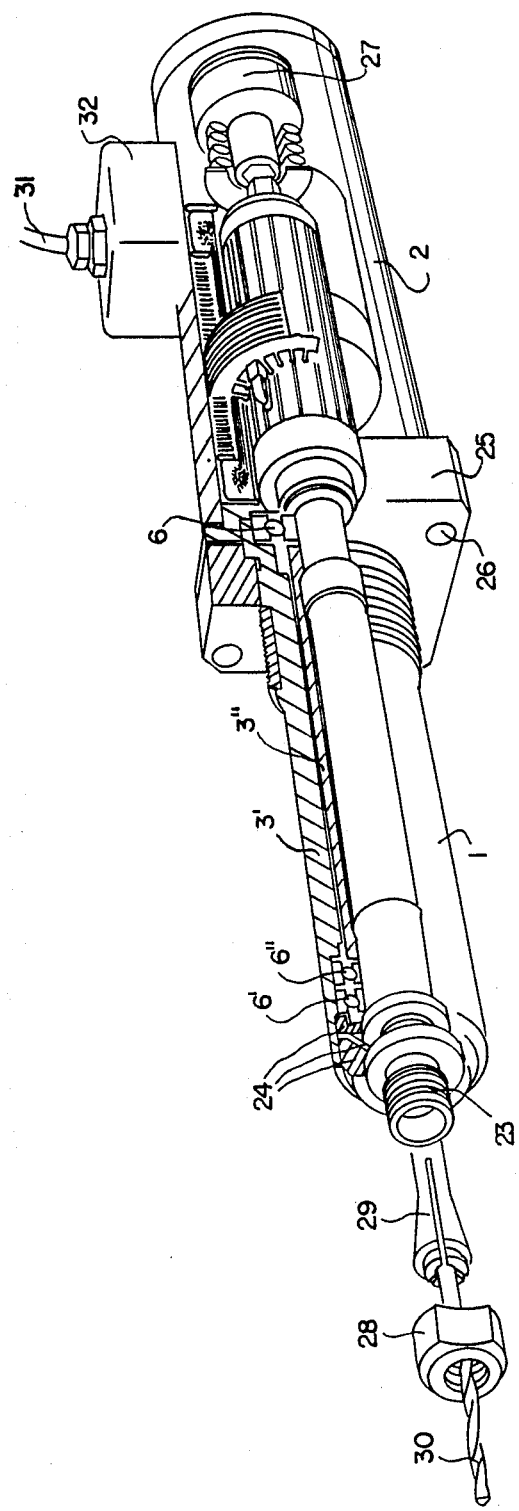
FIG. 1 represents the entire unit partly sectioned along its longitudinal axis.

In short, the electric arbor, as shown in FIG. 1, is made up of a sleeve 3 (FIGS. 3 and 4) inside of which is inserted arbor shaft 23 (FIGS. 1 and 3) supported by bearings 6 (FIGS. 1 and 3) and by the group of bearings 6′ and 6″ (FIGS. 1 and 3); and induction motor 2 (FIGS. 1 and 2), which is fastened by four screws 26 (FIGS. 1 and 2) cantilevered by flanges 25 (FIGS. 1 and 2).

Figure 9:
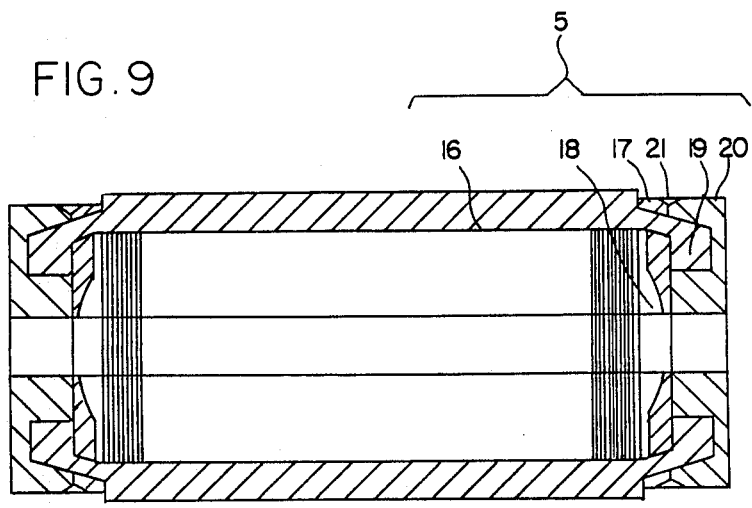
FIG. 9 represents the rotor and its component elements.
Figure 11:
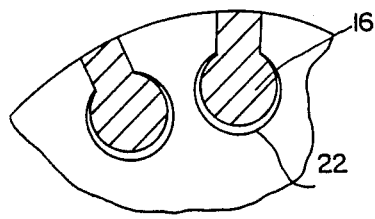
FIG. 11 represents the wires that form the rotor squirrel cage and where the damping resin is inserted.

Rotor 5 (FIGS. 2 and 9), which translates the electromagnetic energy, into mechanical energy is mounted, also cantilevered, on the arbor shaft.

Completing the unit, there are:

(a) dynamic and static sealing device 24 (FIGS. 1 and 3) mounted on the front part of arbor shaft 23 (FIGS. 1 and 3).

Figure 5:
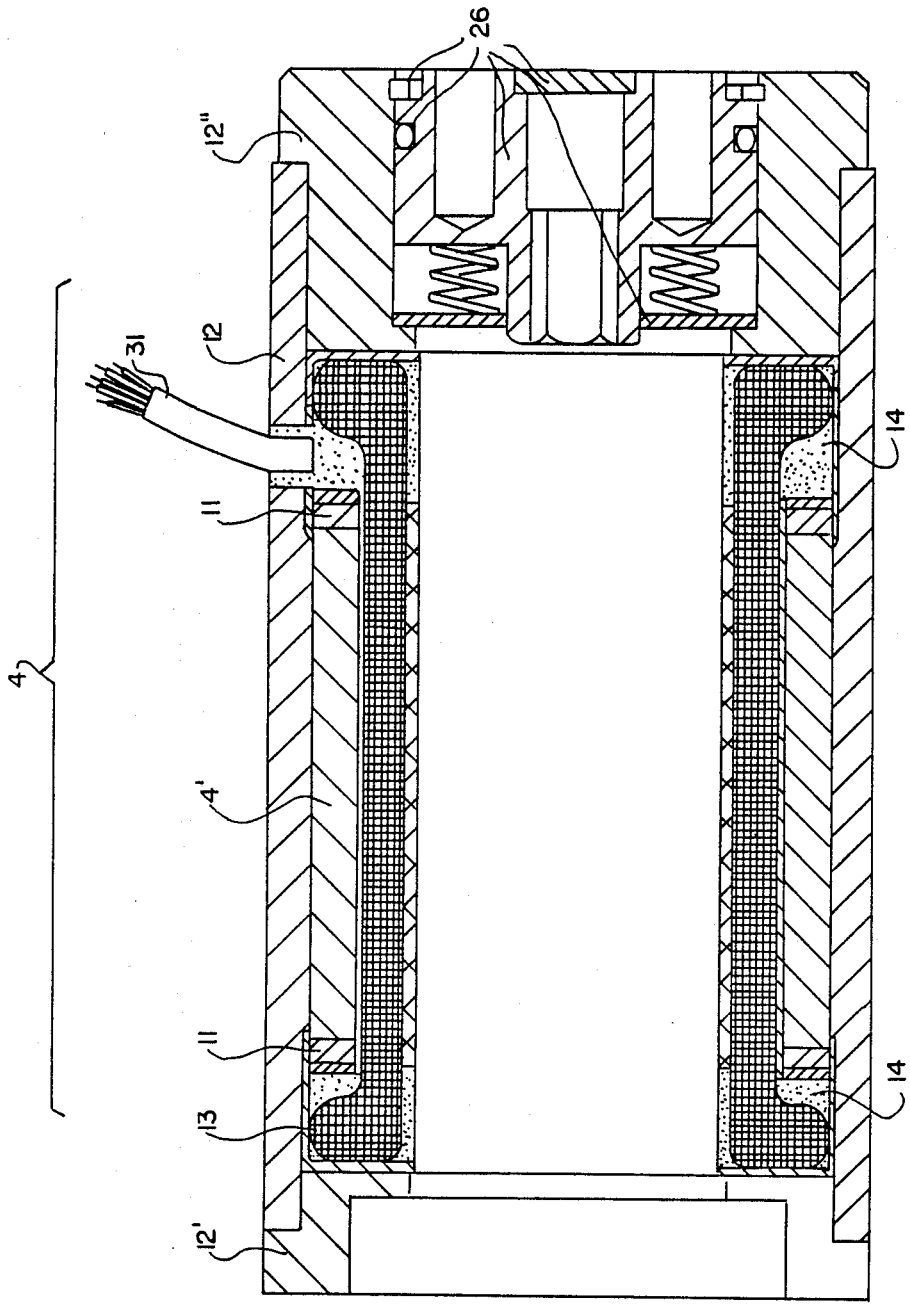
FIG. 5 represents, in axial section, the assembly of all the elements that make up the static part of the induction motor.
Figure 8:
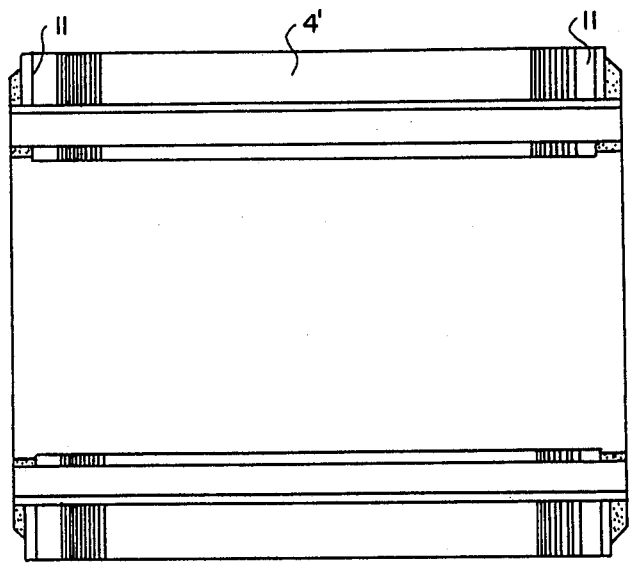
FIG. 8 represents the stator core stack and the end washers.

(b) clamping device 26 (FIGS. 1,2 and 5) of arbor shaft 23 (FIGS. 1 and 3) mounted behind and on the inside of motor (FIGS. 1, 2 and 5).

(c) electrical connection box 32 (FIGS. 1 and 2) fastened laterally to the frame of the motor by two screws 33 (FIGS. 1 and 2) which fastens and protects supply cable 31 (FIGS. 1 and 5). For said box there is also provided a version with plug and socket for quick coupling and uncoupling.

Sleeve 3 (FIGS. 3 and 4) comprises two coaxial tubular parts 3′ and 3″ (FIGS. 3 and 4); they are made from remelted chrome steel, preshaped by forging, successively worked by chip removal, then core thermally treated (including cooling at −70° C.) (hardness: 62 HRC). The working of the two parts is initially normal, i.e., each single part is worked independently of the other.

When the first grinding operations are completed, the two parts 3′ and 3″ are assembled (FIG. 4) and fastened by internally threaded nut 34 (FIG. 4). To allow fastening of part 3″ inside 3′ (FIG. 4), part 3″ is designed with a head on its end and a threaded part on its opposite end, while part 3′ is designed with two suitable seats (as shown in FIG. 4). The two parts 3′ and 3″, assembled as said, undergo the final grinding which exactly characterizes the extreme precision of sleeve 3 the distance 3‴ (which for good operation of the arbor does not allow tolerances between the outside shoulders of 3′ and the inside shoulders of 3″) is achieved while the seats of bearings 35 and 36 (FIG. 4) are ground.

Obviously by proceeding in this way, the shoulders at distance 3‴ of outside part 3′ will have the identical dimension of the shoulders of inside part 3″. Also the two inside seats 35′ and 36′ (FIG. 4) of part 3″ are ground while respective seats 35 and 36 are ground, thus obtaining a very close tolerance of concentricity which does not exceed the value of 0.002 mm.

Part 3″ finally will undergo another operation of removal of the head which was used for workings performed together with part 3′ (FIG. 4).

The outside diameter of sleeve 3 (FIGS. 3 and 4) is finished with a diamond grinding wheel with resin binder to obtain a slight roughness (Ra: 0.08–0.15 μm) and very limited machining tolerances: nominal diameter +0.002/+0.004 mm; roundness within 0.001 mm and cylindricality, over the entire length of the sleeve, within 0.0015 mm.

With these characteristics the sleeve can be mounted in a bushing with ball bearing cage allowing the dynamic rectilinear movement of the electric arbor with great precision and rigidity.

Considering the precision obtained in sleeve 3, according to the invention, it is possible to mount bearings 6, 6′ and 6″ (FIGS. 1 and 3) with very great precision, matched at the manufacturer's to have absolute guarantee of desired prestress values without having to perform any measurement or adjustment. The particular method of making sleeve 3 and the materials selected for the two components 3′ and 3″ guarantee perfect functioning even with temperature variations; actually the possible expansion difference, for the two parts in question 3′ and 3″ (FIG. 4) is so small as to be practically insignificant and in any case would be translated into a load variation far less than the load variations that arbor 1 (FIGS. 1 and 2) must support because of the work that it must perform.

Arbor shaft 23 (FIGS. 1 and 3), made of case-hardened, tempered steel (hardness 60 HRC), is provided in various shapes of the front end part ("nose"):

for clamping of tool 30 (FIG. 1) by means of a chuck 29 and relative nut 28 (FIG. 1);

for holding of conical tools clamped by means of a nut;

for holding conical tools with fast coupling and uncoupling;

for tools or tool-holders with flange clamp.

The version of the arbor shaft is also provided with a central bore for cooling liquid for lubrication of the tool, since in many cases, given the high speed of rotation, the cooling liquid and/or lubrication directed at the tool by an outside jet actually does not reach the tool because of the vortex produced by the tool itself.

At the front end of arbor shaft 23 (FIGS. 1 and 3), for protection of bearings 6' and 6" is a dynamic and static sealing device 24 (FIGS. 1 and 3). It is a gasket that does not allow infiltration of liquids and solid particles which otherwise would seriously damage bearings 6' and 6".

The feature of said device 24 consists in the fact that when the electric arbor is stopped, the gasket, made of a synthetic material resistant to very many chemical agents, presses against a thermally treated, lapped steel washer; when the unit is in operation said gasket first lightens the pressure against the washer, then, when a certain number of rpms is reached, the gasket is removed completely by centrifugal effect to allow the highest rotation condition with minimum friction.

Figure 7:
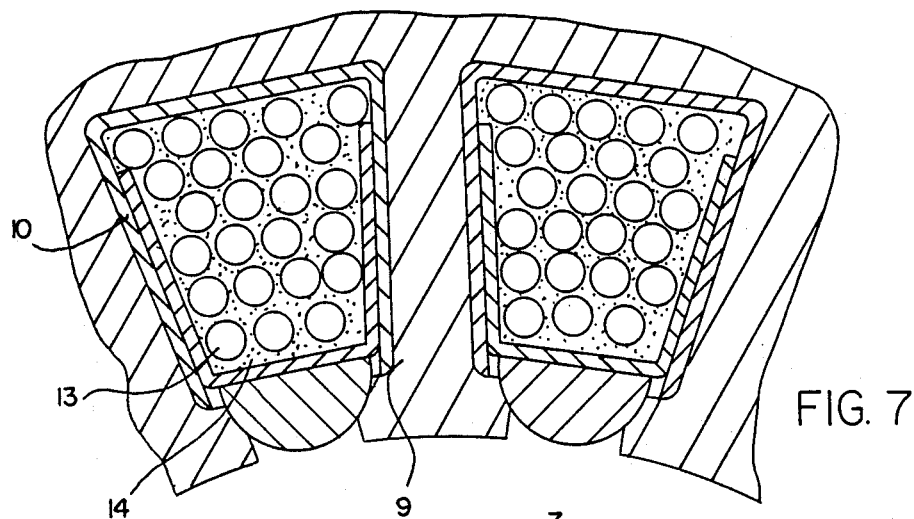
FIG. 7 represents the insulations of the stator slots, the windings, the insulating resin in the slots and the shape of the teeth.
Figure 6:
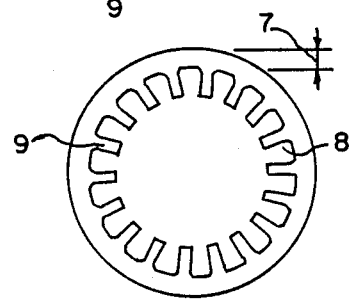
FIG. 6 represents the shape of the laminations that make up the stator core stack of the motor, showing the proportioning of the ring, slots and teeth.

Stator 4 (FIGS. 2 and 5) of the electric arbor in question, according to the invention, is made up of magnetic laminations (FIG. 6) of very small thickness, to allow small losses even at high frequencies up to and beyond 3000 Hz, and incorporated with epoxy resin 14 (FIGS. 5 and 7) charged with sand particles which improve the thermal conductivity without compromising its electrical insulation which results from very high resistivity. The composition of the material from which the laminations (FIG. 6) are made is such as to allow a high magnetic saturation, so a proportioning has been sought in stator slots 8 (FIG. 6), outside ring 7 (fig. 6) and teeth 9 (FIG. 6) which would permit maximum use to be made of the quality of the material; for this purpose, materials with the highest resistivity are used for insulations 10 (FIG. 7) of the stator slots to allow a considerable reduction of the thickness of said insulations 10 without compromising the insulation of the stator. In any case in regard to the insulation, resin 14 (FIGS. 5 and 7) is decisive, which is inserted hot and accelerates the individual molecules of the resin, which being placed between the coils of winding 13 (FIG. 7) and between the winding 13 itself and frame 12, 12' and 12" (FIG. 5) and winding 13 itself and frame 12, 12' and 12" (FIG. 5) and core stack 4' (FIG. 5) guarantees the final result and gives the stator thus constructed great reliability in time.

This special construction, besides limiting the losses, considerably improves the resistance of the winding, makes it practically insensitive to water, to many radiations, to many chemical agents and notably improves the heat dispersion capacity; consequently most of the electric arbors made according to the invention can be lubricated with grease and therefore completely closed.

Forced lubrication with an oil mist is provided only for certain applications, and in particular for shafts with larger dimensions and used for very high speeds.

Figure 10:
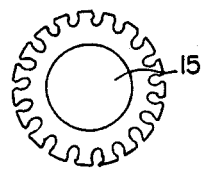
FIG. 10 represents the shape of the laminations that make up the rotor core stack and the proportioning of the relative hole for the shaft.

Rotor 5 (FIGS. 1 and 9) made with magnetic laminations (FIG. 10) with low loss and slight thickness, dimensioned or low-resistance conductors makes it possible to use a larger than normal shaft.

The construction is particularly sturdy, thanks to rings 17 (FIG. 9), and housings 20 (FIG. 9) of stainless steel and, with the damping resin that neutralizes the effects of resonance to which conductors 16 (FIG. 9) are subjected, it allows very high rotation speeds while allowing a good service life of the bearings. This rotor, thus constructed, makes it possible to dimension the diameter of the rotor itself greater than normal, by which a notably higher torque is available even at low rotation conditions.

The main advantages offered by the electric arbor under discussion are:
Simple, sturdy and modular construction;
High torque at any operating conditions;
Extremely reduced vibrations;
Operating silence;
No adjustment of the prestress of the bearings;
Extreme simplicity in use.

The "modular" construction, i.e., with easily interchangeable groups, allows the achievement of units that reasonably meet a large number of specific requirements; also allowing easy updating of the same unit to adapt it to the ever faster developments of the market which the user must face.

The particularly simple, sturdy mechanics, the electromagnetic dimensioning with ample reserves and the use of suitable materials, as provided by this invention, allow the use of this electric arbor on highly productive automatic machines with very high productivity which work with a continuous cycle, i.e., 24 hours a day.

The high mechanical stability, the precision of rotation and the precision of rectilinear movement (advance of work) that an electric arbor made according to the invention can attain allows the use of highly productive tools, for example: of hard metal, ceramics, natural diamonds, synthetic diamonds and boron nitride.

The quite compact dimensions and the possible motorizing characteristics for said electric arbor, according to the invention, in particular the high torque available even at low speeds, joined with the simplicity of substitution of tools and the relatively low cost are factors that allow the use of the electric arbor under discussion even on small all-purpose machines, for example lathes and milling machines, for operation of:
grinding; internal, external and end;
milling and turning;
drilling;
milling;
turning with rotating tool; internal and external; and
burnishing.

I claim:

1. An electric arbor integrated with an induction motor, for durable high frequency operation, comprising an induction motor and an arbor assembly detachably securable thereto; said arbor assembly comprising an outer sleeve and a coaxial inner sleeve, said outer sleeve having opposite ends each defining a bearing seat, each said bearing seat having an annular radially extending shoulder, said bearing seats and said coaxial inner sleeve being precisely machined such that said coaxial inner sleeve has a length substantially identical to the distance between said bearing seats; said arbor assembly further comprising an arbor shaft fitted in said coaxial inner sleeve and pre-stressed bearings surrounding said arbor shaft and received in said bearing seats.

2. Arbor according to claim 1, wherein said coaxial inner sleeve has opposite ends having been machined simultaneously with corresponding said bearing seats, with said outer and inner sleeves being maintained interassembled, thereby to provide said substantially identical length.

* * * * *